(12) United States Patent
Yasuda

(10) Patent No.: US 10,150,404 B2
(45) Date of Patent: Dec. 11, 2018

(54) VEHICLE LAMP

(71) Applicant: Koito Manufacturing Co., Ltd., Tokyo (JP)

(72) Inventor: Yuji Yasuda, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 15/429,383

(22) Filed: Feb. 10, 2017

(65) Prior Publication Data

US 2017/0248287 A1    Aug. 31, 2017

(30) Foreign Application Priority Data

Feb. 26, 2016   (JP) .................................. 2016-035194

(51) Int. Cl.
| | |
|---|---|
| *F21V 7/00* | (2006.01) |
| *B60Q 1/00* | (2006.01) |
| *B60Q 1/068* | (2006.01) |
| *F21S 41/19* | (2018.01) |
| *F21S 41/147* | (2018.01) |
| *F21S 41/663* | (2018.01) |
| *F21S 45/49* | (2018.01) |
| *F21S 45/47* | (2018.01) |
| *F21S 41/32* | (2018.01) |
| *F21S 41/36* | (2018.01) |

(52) U.S. Cl.
CPC ......... *B60Q 1/0041* (2013.01); *B60Q 1/0683* (2013.01); *F21S 41/147* (2018.01); *F21S 41/192* (2018.01); *F21S 41/663* (2018.01); *F21S 45/47* (2018.01); *F21S 45/49* (2018.01); *F21S 41/321* (2018.01); *F21S 41/36* (2018.01)

(58) Field of Classification Search
CPC .......... B60Q 1/0041; B60Q 1/24; B60Q 1/18; B60Q 1/16; B60Q 1/08; B60Q 1/06; B60Q 1/068; F21S 41/97; F21S 41/192; F21S 41/321; F21S 41/36; F21S 41/663; F21S 41/47; F21S 41/49
See application file for complete search history.

(56) References Cited

U.S. PATENT DOCUMENTS

| | | | | |
|---|---|---|---|---|
| 2010/0128484 A1* | 5/2010 | Peng | ...................... | F21V 29/004 362/294 |
| 2011/0286231 A1* | 11/2011 | Sugie | .................... | F21V 19/001 362/549 |
| 2012/0307501 A1* | 12/2012 | Tankala | .................... | F21K 9/90 362/294 |

(Continued)

FOREIGN PATENT DOCUMENTS

JP    2012-064493 A    3/2012

*Primary Examiner* — Ali Alavi
(74) *Attorney, Agent, or Firm* — Abelman, Frayne & Schwab

(57) ABSTRACT

The present disclosure provides a vehicle lamp including: a circuit board having a front surface and a rear surface and mounted with a light emitting element on the front surface; a heat dissipating member disposed to be opposite to the circuit board; a spacer disposed between the circuit board and the heat dissipating member to hold an interval between the circuit board and the heat dissipating member; and a coating type insulative heat conducting member disposed between the circuit board and the heat dissipating member.

20 Claims, 6 Drawing Sheets

(56) References Cited

U.S. PATENT DOCUMENTS

| | | | | |
|---|---|---|---|---|
| 2013/0044501 A1* | 2/2013 | Rudisill | ................ | H05K 3/325 |
| | | | | 362/398 |
| 2014/0063794 A1* | 3/2014 | Parekh | .................... | F21S 8/04 |
| | | | | 362/185 |
| 2014/0307441 A1* | 10/2014 | Wu | ...................... | F21V 31/005 |
| | | | | 362/267 |
| 2015/0204528 A1* | 7/2015 | Zeng | ................ | H05B 33/0803 |
| | | | | 362/363 |

* cited by examiner

VEHICLE LAMP

CROSS-REFERENCE TO RELATED APPLICATIONS

This application is based on and claims priority from Japanese Patent Application No. 2016-035194, filed on Feb. 26, 2016, with the Japan Patent Office, the disclosure of which is incorporated herein in its entirety by reference.

TECHNICAL FIELD

The present disclosure relates to a vehicle lamp. In particular, the present disclosure relates to a vehicle lamp in which light emitting elements are mounted on a circuit board, and a heat dissipation from the circuit board is performed by a heat dissipating member.

BACKGROUND

Conventionally, a vehicle lamp using a light emitting element such as, for example, a light emitting diode (LED) as a light source has been suggested. The light emitting element tends to generate heat in accordance with a light emission thereby increasing a temperature, and further, the light emission efficiency of the light emitting element is affected by the temperature. Thus, in the conventional vehicle lamp, the temperature increase is suppressed by transferring the heat from the light emitting element to a heat dissipating member in order to keep the temperature of the light emitting element within a range suitable for the light emission.

For example, the conventional technology disclosed in Japanese Patent Laid-Open Publication No. 2012-064493 relates to a vehicle lamp in which a light emitting diode is mounted on a circuit board and faces a reflector so as to irradiate light to the front side of a vehicle. In addition, an aluminum-made light source support member is used as a heat sink to dissipate the heat generated from the light emitting diode. The heat sink is in contact with the rear surface of the circuit board so as to dissipate the heat from the light emitting diode to the outside through the circuit board and the heat sink.

In the conventional technology, a heat conducting member having excellent heat conductivity is generally interposed between the heat sink and the circuit board in order to effectively implement the heat conduction among the respective members. Further, since a wiring layer may also be formed on the rear side of the circuit board, it is also demanded to secure an insulation between the heat sink and the circuit board which are made of a metal.

As the heat conducting member meeting both the excellent heat conductivity and the insulation, a heat conducting sheet pre-molded in a sheet form may be used. However, since a process of bonding the heat conducting sheet is required, the number of assembly processes increases thereby deteriorating the workability, and since the heat conducting sheet is relatively expensive, the manufacturing costs increase. In addition, when the heat conducting sheet is used, a predetermined pressure is applied in a state where the heat conducting sheet is inserted between the heat sink and the circuit board, so as to compress the heat conducting sheet, and the heat sink and the circuit board are held in the state where the heat conducting sheet is compressed. In this case, there are problems in that, since a resin board used as the circuit board is compressed by the heat conducting sheet from the rear surface side, a warpage of the board occurs thereby causing the position of the light emitting element to be deviated from a focal point of the reflector, and as a result, an adjustment for obtaining a desired light irradiation range becomes complicated.

SUMMARY

When a coating type heat conducting member such as, for example, a heat conductive grease or a heat conductive adhesive is used to suppress the warpage of the board by the heat conducting sheet, the heat conducting member is sandwiched to thinly spread between the heat sink and the circuit board, and the heat sink and the circuit board may be in direct contact with each other thereby causing the wiring layer and the heat sink to be conducted with each other. In addition, when a large gap is held between the heat sink and the circuit board in order to ensure the insulation between the heat sink and the circuit board, the heat conductivity is deteriorated.

Thus, it is required to hold a proper gap between the heat sink and the circuit board in order to ensure the heat conductivity and the insulation. However, Japanese Patent Laid-Open Publication No. 2012-064493 does not disclose a structure for holding a proper gap between the heat sink and the circuit board. Further, it is difficult to interpose the coating type heat conducting member (e.g., a heat conductive grease or a heat conductive adhesive) between the heat sink and the circuit board.

In addition, since a metal material such as, for example, aluminum is subjected to a press working to be used as the heat sink, and a flat plate shaped resin board is used as the circuit board, it is difficult to perform a fine processing for securing a fine gap of several microns to several millimeters between the heat sink and the circuit board.

Accordingly, an object of the present disclosure is to provide a vehicle lamp in which the insulation and the heat conductivity may be secured with a simple configuration while the coating type heat conducting member is disposed between the heat dissipating member and the circuit board.

In order to solve the foregoing problems, the vehicle lamp of the present disclosure includes: a circuit board having a front surface and a rear surface and including a light emitting element mounted on the front surface; a heat dissipating member disposed to face the circuit board; a spacer disposed between the circuit board and the heat dissipating member to hold a gap between the circuit board and the heat dissipating member; and a coating type insulative heat conducting member disposed between the circuit board and the heat dissipating member.

In the vehicle lamp of the present disclosure, the gap between the circuit board and the heat dissipating member is held by installing the spacer therebetween, and the coating type heat conducting member is interposed between the circuit board and the heat dissipating member so that the insulation and the heat conductivity may be secured with the simple configuration.

In an aspect of the present disclosure, the coating type heat conducting member is a heat conductive grease or a heat conductive adhesive.

In an aspect of the present disclosure, the coating type heat conducting member contains a filler, and the gap between the circuit board and the heat dissipating member is larger than a maximum grain size of the filler.

In an aspect of the present disclosure, a circuit board holding member that holds the circuit board is provided, and the spacer is formed integrally with the circuit board holding member.

In an aspect of the present disclosure, the spacer is a boss formed to project from the circuit board holding member.

In an aspect of the present disclosure, the boss has a multistage shape provided with a first holder that is in contact with the circuit board and a second holder that is in contact with the heat dissipating member.

In an aspect of the present disclosure, the circuit board holding member is a reflector having a reflecting surface that reflects light from the light emitting element.

In an aspect of the present disclosure, a heat dissipating member holding member configured to hold the heat dissipating member is provided, and the spacer is a boss formed to project from the heat dissipating member holding member to be in contact with the rear surface.

In the present disclosure, a vehicle lamp may be provided in which the insulation and the heat conductivity may be secured with the simple configuration while the coating type heat conducting member is disposed between the heat dissipating member and the circuit board.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
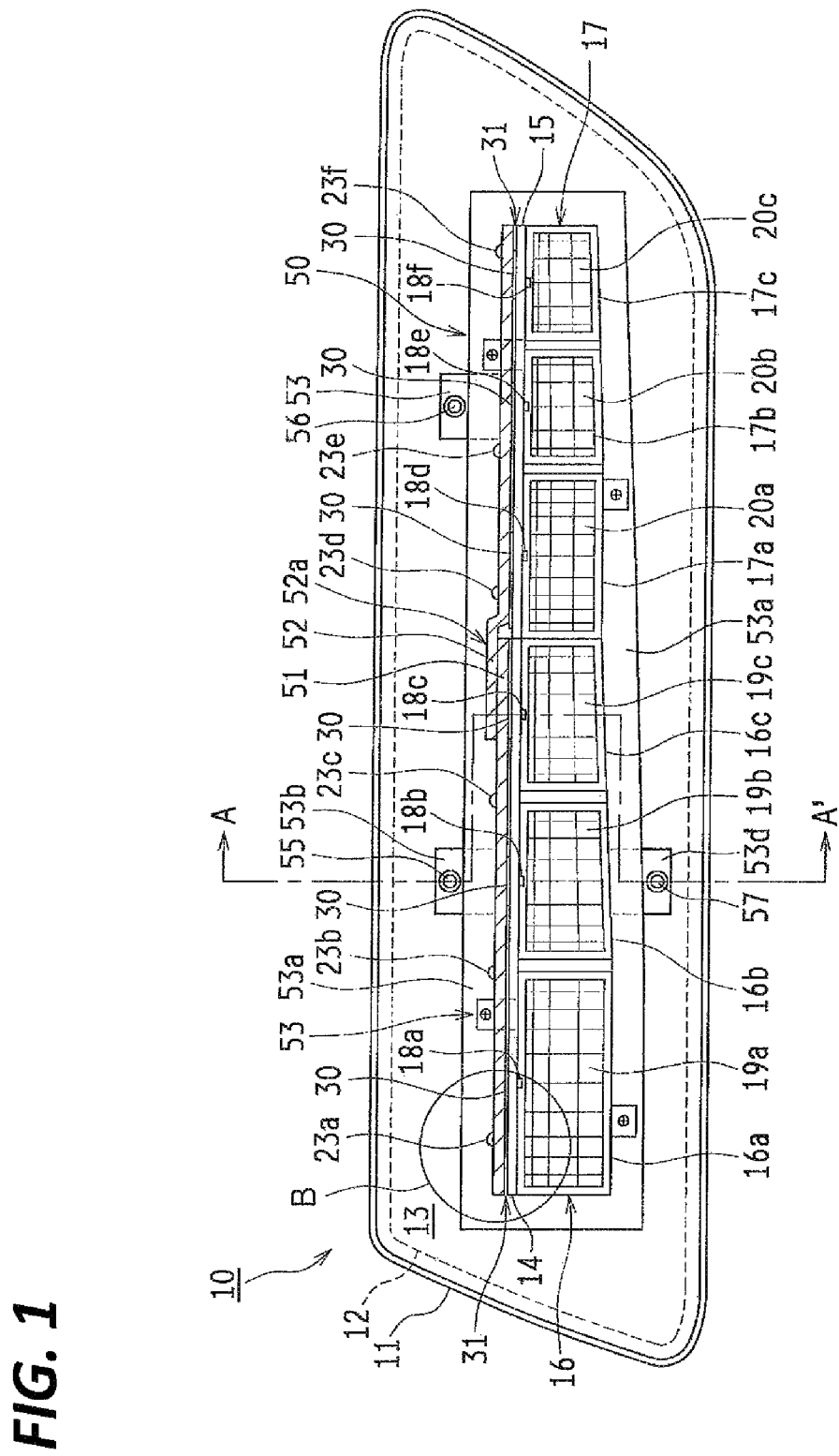
FIG. 1 is a schematic front view of a vehicle lamp in a first exemplary embodiment.

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

First Exemplary Embodiment

Hereinafter, exemplary embodiments of the present disclosure will be described in detail with reference to the drawings. Identical or equivalent components, members, and processes illustrated in the respective drawings will be denoted by the same reference numerals, and overlapping descriptions thereof will be appropriately omitted. In addition, when terms indicating directions such as, for example, "upper," "lower," "front," "rear," "left," "right," "inner," and "outer" are used, the terms indicate the directions in the posture of a vehicle in which the vehicle lamp is mounted.

Figure 2:
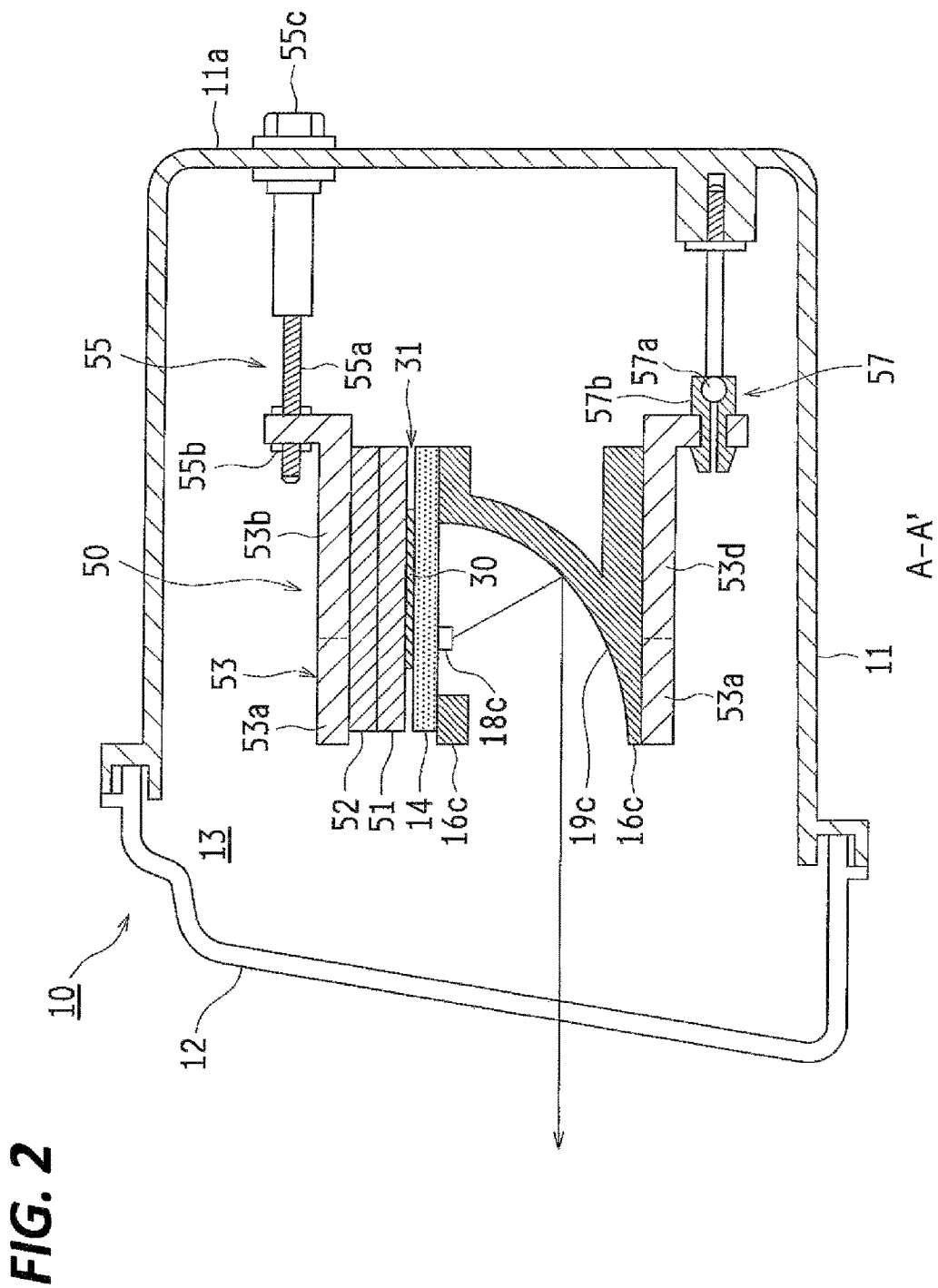
FIG. 2 is a sectional view of the vehicle lamp which is taken along the line A-A' in FIG. 1.

FIG. 1 is a schematic front view of a vehicle lamp 10 according to an exemplary embodiment. FIG. 2 is a sectional view of the vehicle lamp 10 which is taken along the line A-A' in FIG. 1. The vehicle lamp 10 illustrated in FIG. 1 is a head lamp provided in each of the left side and the right side of the front part of a vehicle. Since the structures of the left and right lamps are substantially the same, the structure of the vehicle lamp provided in the left side of the vehicle will be described representatively.

As illustrated in FIGS. 1 and 2, the vehicle lamp 10 includes a lamp body 11 and an outer cover 12 that covers the front opening of the lamp body 11. The lamp body 11 and the outer cover 12 form a lamp chamber 13. The outer cover 12 has a shape following the slant nose shape of a vehicle and is slanted toward the rear side of the vehicle over the inner side to the outer side of the vehicle. Accordingly, the lamp chamber 13 formed by the lamp body 11 and the outer cover 12 is a space slanted toward the rear side of the vehicle from the internal side of the vehicle to the external side.

A lamp unit 50 is accommodated in the lamp chamber 13. The lamp unit 50 is configured to irradiate a high beam light distribution pattern and a low beam light distribution pattern. The lamp unit 50 includes a high beam substrate 14, a low beam substrate 15, a high beam reflector unit 16, a low beam reflector unit 17, a high beam heat dissipating plate 51, a low beam heat dissipating plate 52, and a bracket 53.

The high beam reflector unit 16 and the low beam reflector unit 17 are arranged side by side in the width direction of the vehicle. The high beam reflector unit 16 is disposed at the inner side of the vehicle, and the low beam reflector unit 17 is disposed at the outer side of the vehicle.

The high beam reflector unit 16 is a reflector group used to irradiate a high beam and includes three (3) parabola-shaped reflectors, i.e. a high beam diffusion reflector 16a, a first high beam condensation reflector 16b, and a second high beam condensation reflector 16c. The three reflectors are integrally formed. Among the three reflectors, the high beam diffusion reflector 16a is installed in the innermost side of the vehicle, the first high beam condensation reflector 16b is installed at the outer side of the high beam diffusion reflector 16a, and the second high beam condensation reflector 16c is installed at the outer side of the first high beam condensation reflector 16b.

The high beam diffusion reflector 16a, the first high beam condensation reflector 16b, and the second high beam condensation reflector 16c have reflecting surfaces 19a to 19c, respectively, which are formed on the basis of rotating paraboloids. A rotating central axis of each rotating paraboloid is an optical axis of each reflector. Each reflector is disposed such that the optical axis is directed toward the front-and-rear direction of the vehicle (a horizontal direction).

The low beam reflector unit 17 is a reflector group used to irradiate a low beam and includes three (3) parabola-shaped reflectors, i.e. a low beam diffusion reflector 17a, a first low beam condensation reflector 17b, and a second low beam condensation reflector 16c. The three reflectors are integrally formed. Among the three reflectors, the low beam diffusion reflector 17a is installed in the innermost side of the vehicle, the first low beam condensation reflector 17b is installed at the outer side of the low beam diffusion reflector 17a, and the second low beam condensation reflector 17c is installed at the outer side of the first low beam condensation reflector 17b.

The low beam diffusion reflector 17a, the first low beam condensation reflector 17b, and the second low beam condensation reflector 17c have reflecting surfaces 20a to 20c, respectively, which are formed on the basis of rotating paraboloids. A rotating central axis of each rotating paraboloid is an optical axis of each reflector. Each reflector is disposed such that the optical axis is directed toward the front-and-rear direction of the vehicle (a horizontal direction).

The high beam reflector unit 16 and the low beam reflector unit 17 are formed by depositing aluminum on the inner surface of a resin-molded base.

The high beam substrate 14 is supported on the top surface of the high beam reflector unit 16. Three (3) LEDs (first to third LEDs 18a to 18c) are mounted on the high beam substrate 14 such that the light emitting surfaces of the LEDs are directed downward. The first to third LEDs 18a to LED 18c are supplied with a current from the high beam substrate 14 so as to emit light. The first LED 18a to the third LED 18c are used to irradiate a high beam. The first LED 18a is disposed at the position of the focal point of the reflecting surface 19a of the high beam diffusion reflector 16a. The second LED 18b is disposed at the position of the focal point of the reflecting surface 19b of the high beam condensation reflector 16b. The third LED 18c is disposed at the position of the focal point of the second high beam condensation reflector 16c. Holes are formed on the top surface of the high beam reflector unit 16 to guide the light from each of the LEDs to one of the reflecting surfaces of the reflectors.

The low beam substrate 15 is supported on the top surface of the low beam reflector unit 17. Three (3) LEDs (fourth to sixth LEDs 18d to 18f) are mounted on the low beam substrate 15 such that the light emitting surfaces of the LEDs are directed downward. The fourth to sixth LEDs 18d to 18f are supplied with a current from the low beam substrate 15 so as to emit light. The fourth to sixth LEDs 18d to 18f are used to irradiate a low beam. The fourth LED 18d is disposed at the position of the focal point of the reflecting surface 20a of the low beam diffusion reflector 17a. The fifth LED 18e is disposed at the position of the focal point of the reflecting surface 20b of the first low beam condensation reflector 17b. The sixth LED 18f is disposed at the position of the focal point of the second low beam condensation reflector 17c. Holes are formed on the top surface of the low beam reflector unit 16 to guide the light from each of the LEDs to one of the reflecting surfaces of the reflectors.

The high beam substrate 14 and the low beam substrate 15 correspond to the circuit board in the present disclosure, and each of the high beam substrate 14 and the low beam substrate 15 is a flat-plate shaped member formed of, for example, a glass epoxy resin with the front and rear surfaces thereof being patterned with wiring layers.

The high beam heat dissipating plate 51 is supported on the rear side (the surface opposite to the component mounting surface) of the high beam substrate 14 via coating type insulative heat conducting members 30. The high beam heat dissipating plate 51 is formed by, for example, an aluminum plate and has a function to dissipate the heat generated from the first to third LEDs 18a to 18c mounted on the high beam substrate 14.

A low beam heat dissipating plate 52 is supported on the rear surface side of the low beam substrate 15 via coating type insulative heat conducting members 30. The low beam heat dissipating plate 52 is also formed by, for example, an aluminum plate and has a function to dissipate the heat generated from the fourth LED 18d to the sixth LED 18f mounted on the low beam substrate 15.

The high beam heat dissipating plate 51 and the low beam heat dissipating plate 52 correspond to the heat dissipating member in the present disclosure, and in the present exemplary embodiment, a member shaped by a press working of a metal plate such as, for example, aluminum, is used. Here, descriptions are made on the example where the heat dissipating member is a member shaped by the press working of the metal plate, but other materials and processing methods may be used. When the high beam heat dissipating plate 51 and the low beam heat dissipating plate 52 are shaped by the press working of the metal plate, the weight and cost reduction of the high beam heat dissipating plate 51 and the low beam heat dissipating plate 52 may be achieved.

In addition, as described later, the high beam heat dissipating plate 51 and the low beam heat dissipating plate 52 are held by respective heat dissipating plate holding bosses 23a to 23c and 23d to 23f with a fine gap 31 being formed between the high beam heat dissipating plate 51 and the low beam heat dissipating plate 52 and the high beam substrate 14 and the low beam substrate 15. In the gap 31, the heat conducting members 30 are disposed at areas that correspond to the rear sides of the first to third LEDs 18a to 18c and the fourth to sixth LEDs 18d to 18f.

The heat conducting members 30 are made of a coating type insulative material and formed by being coated on the front or rear surface of any of the high beam substrate 14, the low beam substrate 15, the high beam heat dissipating plate 51, and the low beam heat dissipating plate 52. Here, the coating type indicates a flowable material that may be supplied on an object through, for example, spraying, dropping, or squeezing to be rolled between a substrate and a heat dissipating plate, and includes a case where the viscosity of the material becomes high or the material is cured after the coating. The flowable material includes, for example, a liquid, gel, or paste type material and also includes a mixture thereof or a material containing other fine particles. The heat conducting members 30 may be, for example, a heat conductive grease or a heat conductive adhesive.

In the present exemplary embodiment, the low beam heat dissipating plate 52 includes an overlap portion 52a extending to overlap with a portion of the high beam heat dissipating plate 51. The overlap portion 52 may be in contact with the overlapping portion of the high beam heat dissipating plate 51. When the overlap portion 52a is provided, the heat dissipation area of the low beam heat dissipating plate 52 increases so that the heat dissipation of the fourth to sixth LEDs 18d LED 18f may be improved.

The bracket 53 is formed of, for example, a resin material and provided with a frame 53a, a first extension portion 53b and a second extension portion 53c that extend rearward from the upper portion of the frame 53a, and a third extension portion 53d that extends rearward from the lower portion of the frame 53a. The frame 53a accommodates the high beam reflector unit 16 and the low beam reflector unit 17 therein so as to support the high beam reflector unit 16 and the low beam reflector unit 17 in the state of being arranged in the width direction of the vehicle. The frame 53a covers only the front portions of the high beam heat dissipating plate 51 and the low beam heat dissipating plate 52, and the other portions thereof (excluding the portions covered by the first to third extension portions) are exposed. This is to improve the heat dissipation performance of the high beam heat dissipating plate 51 and the low beam heat dissipating plate 52.

A first tilting member 55 is attached to the first extension portion 53b, a second tilting member 56 is attached to the second extension portion 53c, and a third tilting member 57 is attached to the third extension portion 53d. The first tilting member 55, the second tilting member 56, and the third tilting member 57 have a function to support the bracket 53 to the lamp body 11 and tilt the bracket 53 for an optical axis adjustment (aiming adjustment).

As illustrated in FIG. 2, the first tilting member 55 includes an aiming screw 55a attached to the rear surface portion 11a of the lamp body 11, a screw connection unit 55b provided in the first extension portion 53b of the bracket 53, and an adjustment unit 55c provided outside the lamp body 11. In addition, the third tilting member 57 includes a ball joint 57a attached to the rear surface portion 11a of the lamp body 11 and a socket 57b for holding the ball of the ball joint 57a. The socket 57b is inserted into and supported in a hole formed in the third extension portion 53d of the bracket 53. Like the third tilting member 57, the second tilting member 56 also includes a ball joint attached to the rear surface portion 11a of the lamp body 11 and a socket holding the ball of the ball joint. The socket is inserted into and supported in a hole formed in the second extension portion 53c of the bracket 53.

When the aiming screw 55a of the first tilting member 55 is rotated by the adjustment unit 55c of the first tilting member 55, the bracket 53 is tiled vertically with respect to the lamp body 11 on the basis of the ball of the ball joint 57a of the third tilting member 57 as a fulcrum, and tiled transversely with respect to the lamp body 11 on the basis of the ball of the ball joint of the second tilting member 56 as a fulcrum. In this way, when the bracket 53 is tiled vertically and transversely with respect to the lamp body 11, the optical axis adjustment of the lamp unit 50 may be performed.

Figure 3:
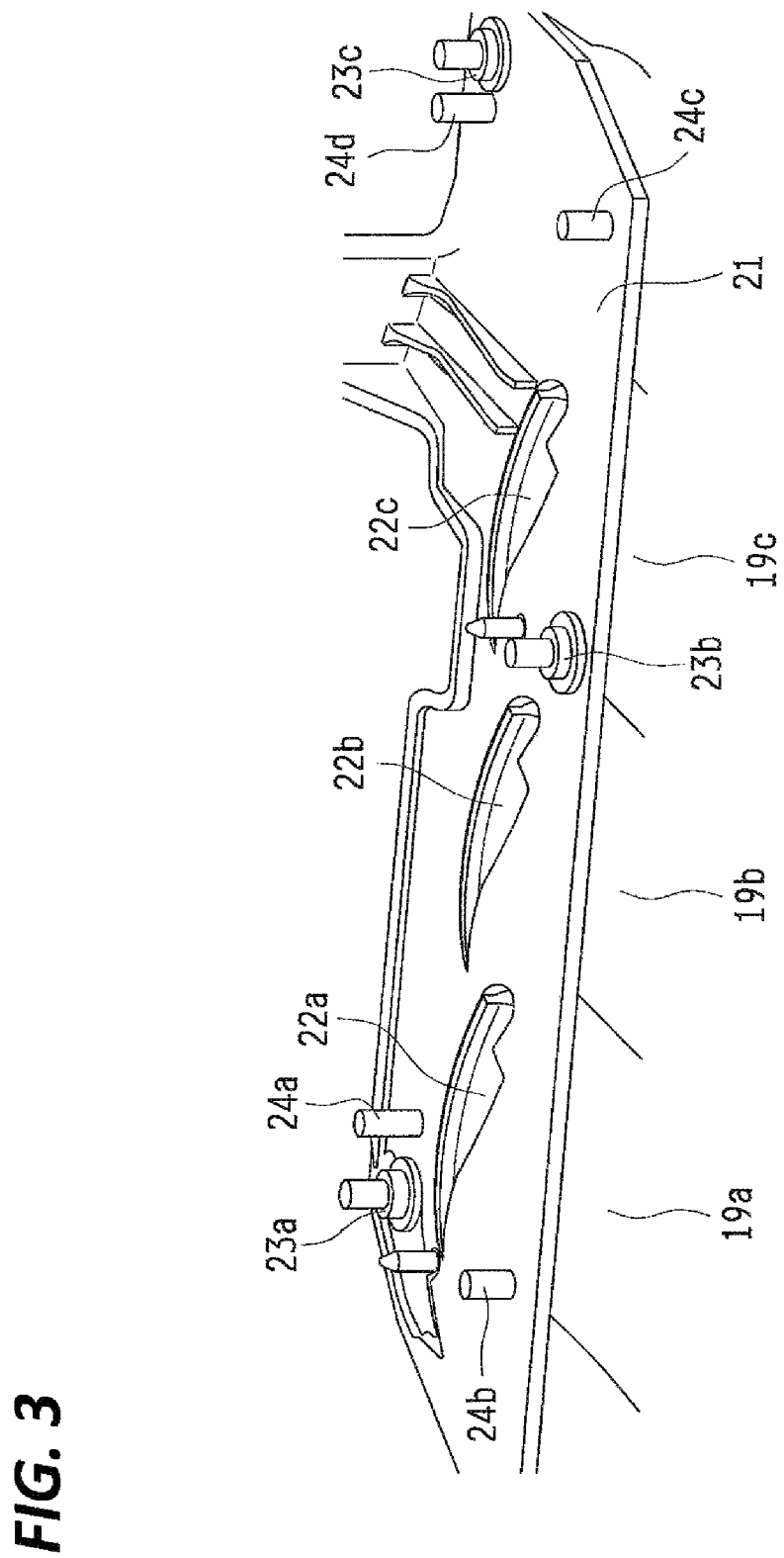
FIG. 3 is a schematic perspective view illustrating the top surface of a high beam reflector unit in the first exemplary embodiment.

FIG. 3 is a schematic perspective view illustrating the top surface of the high beam reflector unit 16 in the present exemplary embodiment. The low beam reflector unit 17 has the same configuration as that of the high beam reflector unit 16, and relevant overlapping descriptions will be omitted. As illustrated in FIG. 3, a top plate 21 is installed in the high beam reflector unit 16 to cover the upper sides of the reflecting surfaces 19a to 19c, and openings 22a to 22c, the heat dissipating plate holding bosses 23a to 23c, and heat caulking bosses 24a to 24d are formed on the top plate 21.

The openings 22a to 22c are formed on the areas of the top plate 21 which correspond to the first to third LEDs 18a 18c and are holes for guiding the light from the LEDs to the reflecting surfaces of the reflectors, respectively, as described above. In the present exemplary embodiment, descriptions are made on the example where three (3) LEDs and three (3) openings 22a to 22c are formed. However, the number of the LEDs and the openings is not limited. In addition, descriptions are made on the example where one (1) LED is disposed for each of the openings 22a to 22c. However, a plurality of LEDs may be disposed for each opening.

The heat dissipating plate holding bosses 23a to 23c are formed to project upward from the top plate 21, and are portions to hold the high beam substrate 14 and the high beam heat dissipating plate 51. Accordingly, the heat dissipating plate holding bosses 23a to 23c function as a spacer to hold a predetermined interval between the high beam substrate 14 and the high beam heat dissipating plate 51 so as to form the gap 31 therebetween. As illustrated in FIG. 3, since the heat dissipating plate holding bosses 23a to 23c are installed at three or more positions on the top plate 21 and disposed not to be aligned on a straight line, a surface for holding the high beam substrate 14 and the high beam heat dissipating plate 51 by the heat dissipating plate holding bosses 23a to 23c at the three positions is determined.

In the present exemplary embodiment, the high beam reflector unit 16 is formed integrally with the heat dissipating plate holding bosses 23a to 23c, and functions as a circuit board holding member to hold the circuit board and also functions as a heat dissipating member holder to hold the heat dissipating member. The detailed structure of the heat dissipating plate holding bosses 23a to 23c and the holding of the high beam substrate 14 and the high beam heat dissipating plate 51 will be described later.

The heat caulking bosses 24a to 24d are formed to project upward from the top plate 21 and inserted into holes formed at corresponding positions of the high beam substrate 14 or the high beam heat dissipating plate 51. The heat caulking bosses 24a to 24d are formed to have a height enough to project from the holes. The projecting tip ends are heat-caulked by being heated and pressed to be plastically deformed so as to cover the holes and fix the high beam substrate 14 and the high beam heat dissipating plate 51.

Figure 4:
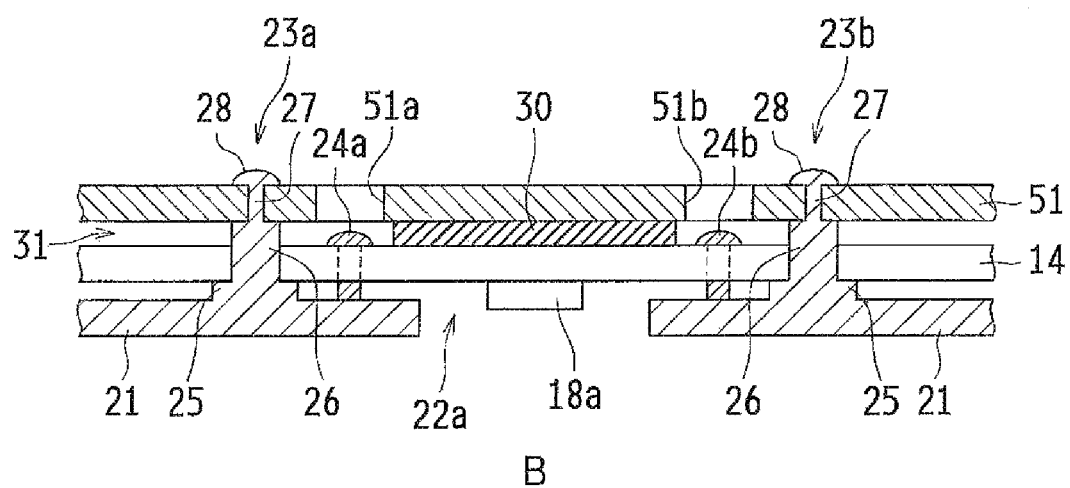
FIG. 4 is a view illustrating the holding of a high beam substrate and a high beam heat dissipating plate by heat dissipating plate holding bosses in the first exemplary embodiment, and a partial sectional view schematically illustrating the area B surrounded by the circle in FIG. 1 in an enlarged scale.

FIG. 4 is a view illustrating the holding of the high beam substrate 14 and the high beam heat dissipating plate 51 by the heat dissipating plate holding bosses 23a and 23b, and a partial sectional view schematically illustrating the area B surrounded by the circle in FIG. 1 in an enlarged scale. The heat dissipating plate holding bosses 23a and 23b have a multistage shape formed with a plurality of stages having different diameters and include circuit board contact stages 25, heat dissipating plate contact stages 26, and heat caulking stages 27 from the lower portions thereof.

Holes having substantially the same diameter as that of the heat dissipating plate contact stages 26 are formed at the positions on the high beam substrate 14 which correspond to the heat dissipating plate holding bosses 23a and 23b. The heat dissipating plate contact stages 26 are aligned with and inserted into the holes, respectively. Accordingly, the top surfaces of the circuit board contact stages 25 are in contact with the bottom surface of the high beam substrate 14, and the high beam substrate 14 is held by the circuit board contact stages 25. Further, holes having substantially the same diameter as that of the heat caulking stages 27 are formed at the positions on the high beam heat dissipating plate 51 which correspond to the heat dissipating plate holding bosses 23a and 23b. The heat caulking stages 27 are aligned with and inserted into the holes, respectively. Accordingly, the top surfaces of the heat dissipating plate contact stages 26 are in contact with the bottom surface of the high beam heat dissipating plate 51, and the high beam heat dissipating plate 51 is held by the heat dissipating plate contact stages 26.

Here, the horizontal position of the high beam substrate 14 is determined by the holes of the high beam substrate 14 and the heat dissipating plate contact stages 26. The horizontal position of the high beam heat dissipating plate 51 is determined by the holes of the high beam heat dissipating plate 51 and the heat caulking stages 27. Descriptions have been made on the example where the holes formed on the high beam substrate 14 and the heat dissipating plate contact stages 26 have substantially the same diameter, and the holes formed on the high beam heat dissipating plate 51 and the heat caulking stages 27 have substantially the same diameter. However, the holes and the stages may have diameters forming a certain gap as long as each stage of the multistage shape may be inserted into the holes, respectively.

The tip ends of the heat caulking stages 27 partially project from the holes of the high beam heat dissipating plate 51, and the projecting tip ends are heated and pressed to be plastically deformed so as to form deformed tip end portions 28 for covering the holes. The height direction of the high beam heat dissipating plate 51 is fixed by the top surfaces of the heat dissipating plate contact stages 26 and the deformed tip end portions 28. Holes are formed at the positions on the high beam substrate 14 which correspond to the heat caulking bosses 24a and 24b, respectively. The heat caulking bosses 24a and 24b are inserted into the holes, respectively, and the tip ends thereof are heat-caulked. The height direction of the high beam substrate 14 is fixed by the top surfaces of the circuit board contact stages 25 and the heat caulking bosses 24a and 24b. In addition, interference suppression holes 51a and 51b are also formed at the positions on the high beam heat dissipating plate 51 which correspond to the heat caulking bosses 24a and 24b, respectively, and the interference between the high beam heat dissipating plate 51 and the heat caulking bosses 24a and 24b is suppressed.

When assembling the lamp unit 50, the holes formed on the high beam substrate 14 are aligned with and fitted on the heat dissipating plate holding bosses 23a and 23b and the heat caulking bosses 24a and 24b, respectively, and the tip ends of the heat caulking bosses 24 and 24b are heat-caulked and fixed. Then, the heat conducting members 30 are coated on the rear side of the high beam substrate 14, the holes of the high beam heat dissipating plate 51 are aligned with and fitted on the heat caulking stages 27, respectively, and the tip ends of the heat caulking stages 27 are heat-caulked and fixed.

As illustrated in FIG. 4, the heat dissipating plate holding bosses 23a and 23b are formed to project from the top plate 21, and the high beam substrate 14 and the high beam heat dissipating plate 51 are held by the heat dissipating plate holding bosses 23a and 23b such that the gap 31 is secured between the high beam substrate 14 and the high beam heat dissipating plate 51. Above the area of the opening 22a formed on the top plate 21, the first LED 18a is mounted on the high beam substrate 14 to face downward and face the reflecting surface 19a (not illustrated). In the gap 31, the heat conducting members 30 are coated on the rear surface side of the area on which the first LED 18a is mounted, and sandwiched between the high beam substrate 14 and the high beam heat dissipating plate 51 to be in contact with and to be rolled between the high bean substrate 14 and the high beam heat dissipating plate 51.

As described above, in the present exemplary embodiment, each of the heat dissipating plate holding bosses 23a and 23b has a multistage shape, and a difference of height between each circuit board contact stage 25 and each heat dissipating plate contact stage 26 corresponds to the sum of the thickness of the high beam substrate 14 and the distance of the gap 31. Accordingly, the heat dissipating contact stages 26 function as a spacer disposed between the high beam substrate 14 and the high beam heat dissipating plate 51 to hold the gap 31. The gap 31 is required to be large enough to secure the insulation between the rear surface of the high beam substrate 14 and the high beam heat dissipating plate 51, and small enough to secure the excellent heat conductivity. Specifically, the gap 31 may be in a range of 0.05 mm to 1.5 mm.

When a material containing a filler (e.g., fine particles of a heat conductive material) is used as the coating type heat conducting members 30, the gap 31 is required to be larger than a maximum grain size of the filler. Accordingly, it may be avoided that the height direction of the high beam heat dissipating plate 51 becomes unstable when a filler larger than the gap 31 is contained.

In the present exemplary embodiment, since the heat dissipating plate holding bosses 23a to 23c are molded of a resin to be integral with the top plate 21 of the high beam reflector unit 16, the processing of a very precise shape in the unit of several microns may be performed, and the manufacturing process and structure may be simplified, the cost reduction may be achieved. Further, since the shape of the high beam substrate 14 or the high beam heat dissipating plate 51 may be simplified, and the heat dissipating plate may be molded by the press working, the manufacturing process and structure may be simplified so that the cost reduction may be achieved. Further, since the tip ends of the heat dissipating plate holding bosses 23a to 23c serve as the heat caulking stages 27, the heat caulking may be used as a means for fastening the high beam heat dissipating plate 51, and a reduction of the number of components or a miniaturization of components, and the simplification of the manufacturing process may be achieved.

Thus, in the vehicle lamp 10 of the present exemplary embodiment, the insulation and the heat conductivity may be ensured by securing the gap 31 between the rear surface of the high beam substrate 14 and the high beam heat dissipating plate 51 and disposing the coating type heat conducting members 30 in the gap 31, with the simple configuration. Accordingly, the warpage of the circuit board or the heat dissipating member occurring when a pre-molded heat conducting sheet is used may be suppressed, and it may be avoided that the light emitting elements are deviated from the positions of the focal points of the reflecting surfaces of the reflectors thereby deteriorating the light distribution characteristic.

Second Exemplary Embodiment

Figure 5:
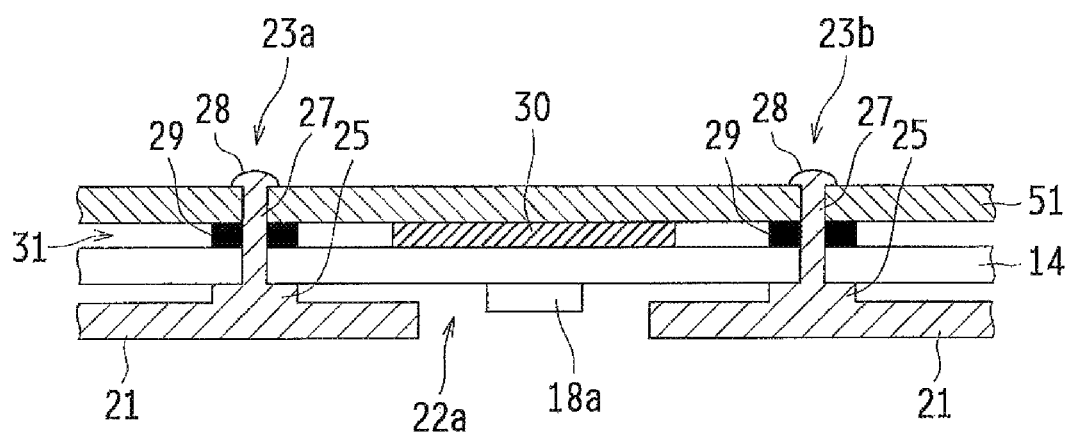
FIG. 5 is a schematic view illustrating the holding of a high beam substrate and a high beam heat dissipating plate by heat dissipating holding bosses in a second exemplary embodiment.

Next, a second exemplary embodiment of the present disclosure will be described with reference to FIG. 5. Descriptions of overlapping portions with those of the first exemplary embodiment will be omitted. FIG. 5 is a schematic view illustrating the holding of the high beam substrate 14 and the high beam heat dissipating plate 51 by the heat dissipating plate holding bosses 23a and 23b, and a partial sectional view schematically illustrating the area B surrounded by the circle in FIG. 1 in an enlarged scale. The present exemplary embodiment is different from the first exemplary embodiment in that the present exemplary embodiment uses a washer as a separate spacer member in order to secure the gap 31 between the high beam substrate 14 and the high beam heat dissipating plate 51.

The heat dissipating plate holding bosses 23a and 23b have a multistage shape formed with a plurality of stages having different diameters, and include the circuit board contact stages 25 and the heat caulking stages 27 from the lower portions thereof. In addition, washers 29 are disposed as a spacer between the high beam substrate 14 and the high beam heat dissipating plate 51 to secure the gap 31 therebetween. In the gap 31, the heat conducting members 30 are coated on the rear surface side of the area on which the first LED 18*a* is mounted, and sandwiched between the high beam substrate 14 and the high beam heat dissipating plate 51 to be in contact with and to be rolled between the high beam substrate 14 and the high beam heat dissipating plate 51.

Holes having substantially the same diameter as that of the heat caulking stages 27 are formed at the positions on the high beam substrate 14 and the high beam heat dissipating plate 51 which correspond to the heat dissipating plate holding bosses 23*a* and 23*b*. The heat caulking stages 27 are aligned with and inserted into the holes and the washers 29, respectively. Accordingly, the top surfaces of the circuit board contact stages 25 are in contact with the bottom surface of the high beam substrate 14, and the high beam substrate 14 is held by the circuit board contact stages 25.

Here, the horizontal position of the high beam substrate 14 and the high beam heat dissipating plate 51 is determined by the holes of the high beam substrate 14 and the high beam heat dissipating plate 51 and the heat caulking stages 27. Descriptions have been made on the example where the holes formed on the high beam substrate 14 and the high beam heat dissipating plate 51 and the heat caulking stages 27 have substantially the same diameter. However, the holes and the stages may have a diameter forming a certain gap as long as each stage of the multistage shape may be inserted.

The tip ends of the heat caulking stages 27 partially project from the holes of the high beam heat dissipating plate 51, and the projecting tip ends are heated and pressed to be plastically deformed so as to form deformed tip end portions 28 for covering the holes. Accordingly, the height direction of the high beam substrate 14, the washers 29, and the high beam heat dissipating plate 51 is determined by the top surfaces of the circuit board substrate contact stages 25 and the deformed tip end portions 28.

As described above, in the present exemplary embodiment, the washers 29 are disposed between the high beam substrate 14 and the high beam heat dissipating plate 51 to function as a spacer for holding the gap 31. The thickness of each washer 29 that determines the gap 31 is required to be large enough to secure the insulation between the rear surface of the high beam substrate 14 and the high beam heat dissipating plate 51, and small enough to secure the excellent heat conductivity. Specifically, the thickness may be in a range of 0.05 mm to 1.5 mm. In the present exemplary embodiment, since the gap 31 for disposing the coating type heat conducting member 30 therein may be secured only by aligning the holes of the high beam substrate 14 with the heat caulking stages 27 to be fitted on the heat caulking stages 27, inserting the heat caulking stages 27 into the washers 29, and aligning the holes of the high beam heat dissipating plate 51 with the heat caulking stages 27 to be fitted on the heat caulking stages 27, the manufacturing process and structure may be simplified.

In the present exemplary embodiment as well, since the heat dissipating plate holding bosses 23*a* to 23*c* are molded of a resin to be integral with the top plate 21 of the high beam reflector unit 16, and the manufacturing process and structure may be simplified, the cost reduction may be achieved. Further, since the shape of the high beam substrate 14 or the high beam heat dissipating plate 51 may be simplified, and the heat dissipating plate may be shaped by the press working, the manufacturing process and structure may be simplified so that the cost reduction may be achieved. Further, since the tip ends of the heat dissipating plate holding bosses 23*a* to 23*c* serve as the heat caulking stages 27, the heat caulking may be used as a means for fastening the high beam heat dissipating plate 51, and a reduction of the number of components or a miniaturization of components and the simplification of the manufacturing process may be achieved.

Accordingly, in the vehicle lamp 10 of the present exemplary embodiment as well, the insulation and the heat conductivity may be ensured by securing the gap 31 between the rear surface of the high beam substrate 14 and the high beam heat dissipating plate 51 and disposing the coating type heat conducting member 30 in the gap 31, with the simple configuration. Accordingly, the warpage of the circuit board or the heat dissipating member occurring when a pre-molded heat conducting sheet is used may be suppressed, and it may be avoided that the light emitting elements are deviated from the positions of the focal points of the reflecting surfaces of the reflectors thereby deteriorating the light distribution characteristic.

Third Exemplary Embodiment

Figure 6:
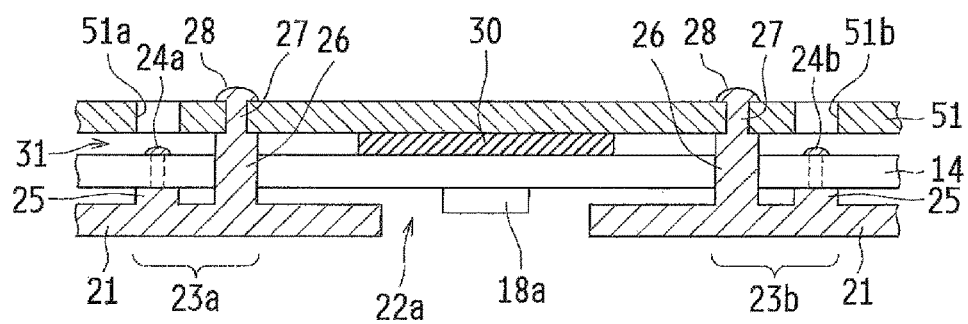
FIG. 6 is a schematic view illustrating the holding of a high beam substrate and a high beam heat dissipating plate by heat dissipating holding bosses in a third exemplary embodiment.

Next, a third exemplary embodiment of the present disclosure will be described with reference to FIG. 6. Descriptions of overlapping portions with those of the first exemplary embodiment will be omitted. FIG. 6 is a schematic view illustrating the holding of the high beam substrate 14 and the high beam heat dissipating plate 51 by the heat dissipating plate holding bosses 23*a* and 23*b* in the third exemplary embodiment, and a partial sectional view schematically illustrating the area B surrounded by the circle in FIG. 1 in an enlarged scale. The present exemplary embodiment is different from the first exemplary embodiment in that, in the present exemplary embodiment, the circuit board contact stages 25 and the heat dissipating plate contact stages 26 are formed in separate areas.

The heat dissipating plate holding bosses 23*a* and 23*b* have a shape of a plurality of bosses formed to project upward from the top plate 21 with different heights, and include the circuit board contact stages 25, the heat dissipating plate contact stages 26, and the heat caulking stages 27 from the side having the low height. The heat dissipating contact stages 26 and the heat caulking stages 27 have a multistage shape in which stages have different diameters. In addition, the heat caulking bosses 24*a* and 24*b* are provided on the circuit board contact stages 25, and the circuit board contact stages 25 and the heat caulking bosses 24*a* and 24*b* have a multistage shape in which stages have different diameters. Here, descriptions are made on the example of the multistage shape in which the heat caulking bosses 24*a* and 24*b* are provided on the circuit board contact stages 25. However, the circuit board contact stages 25 and the heat caulking bosses 24*a* and 24*b* may be provided in different areas of the top plate 21.

Holes having substantially the same diameter as that of the heat dissipating plate contact stages 26 are formed at the positions on the high beam substrate 14 which correspond to the heat dissipating plate holding bosses 23*a* and 23*b*. The heat dissipating plate contact stages 26 are aligned with and inserted into the holes, respectively. Further, holes having substantially the same diameter as the heat caulking stages 27 are also formed at the positions on the high beam heat dissipating plate 51 which correspond to the heat dissipating plate holding bosses 23*a* and 23*b*. The heat caulking stages 27 are aligned with and inserted into the holes, respectively. Accordingly, the top surfaces of the heat dissipating plate contact stages 26 are in contact with the bottom surface of the high bean heat dissipating plate 51, and the high beam heat dissipating plate 51 is held by the heat dissipating plate contact stages 26.

The tip ends of the heat caulking steps 27 partially project from the holes of the high beam heat dissipating plate 51, and the projecting tip ends are heated and pressed to be plastically deformed so as to form deformed tip end portions 28 for covering the holes. The height direction of the high beam heat dissipating plate 51 is fixed by the top surfaces of the heat dissipating plate contact stages 26 and the deformed tip end portions 28.

In addition, with respect to the circuit board contact stages 25 provided to project from the top plate 21 as separate from the heat dissipating plate contact stages 26, the top surfaces of the circuit board contact stages 25 are in contact with the bottom surface of the high beam substrate 14 to hold the high beam substrate 14. Holes are formed at the positions on the high beam substrate 14 which correspond to the heat caulking bosses 24a and 24b. The heat caulking bosses 24a and 24b are inserted into the holes, respectively, and the tip ends thereof are heat-caulked. The height direction of the high beam substrate 14 is fixed by the top surfaces of the circuit board contact stages 25 and the heat caulking bosses 24a and 24b. In addition, the interference suppression holes 51a and 51b are also formed at the positions on the high beam heat dissipating plate 51 which correspond to the heat caulking bosses 24a and 24b, and the interference between the high beam heat dissipating plate 51 and the heat caulking bosses 24a and 24b is suppressed.

As described above, in the present exemplary embodiment, the heat dissipating plate holding bosses 23a and 23b have a shape of a plurality of bosses having different heights, and a difference of height between each circuit board contact stage 25 and each heat dissipating plate contact stage 26 corresponds to a sum of the thickness of the high beam substrate 14 and the distance of the gap 31. Accordingly, the heat dissipating plate contact stages 26 function as a spacer disposed between the high beam substrate 14 and the high beam heat dissipating plate 51 to hold the gap 31. In the gap 31, the heat conducting member 30 is coated on the rear surface side of the area on which the first LED 18a is mounted, and sandwiched between the high beam substrate 14 and the high beam heat dissipating plate 51 to be in contact with and rolled between the high beam substrate 14 and the high beam heat dissipating plate 51.

In the present exemplary embodiment as well, since the heat dissipating plate holding bosses 23a to 23c are molded of a resin to be integral with the top plate 21 of the high beam reflector unit 16, the processing of a very precise shape in the unit of several microns may be performed, and the manufacturing process and structure may also be simplified, the cost reduction may be achieved. Further, since the shape of the high beam substrate 14 or the high beam heat dissipating plate 51 may be simplified, and the heat dissipating plate may be shaped by the press working, the manufacturing process and structure may be simplified so that the cost reduction may be achieved. Further, since the tip ends of the heat dissipating plate holding bosses 23a to 23c serve as the heat caulking stages 27, the heat caulking may be used as a means for fastening the high beam heat dissipating plate 51, and a reduction of the number of components or a miniaturization of components and the simplification of the manufacturing process may be achieved.

Accordingly, in the vehicle lamp 10 of the present exemplary embodiment, the insulation and the heat conductivity may be ensured by securing the gap 31 between the rear surface of the high beam substrate 14 and the high beam heat dissipating plate 51 and disposing the coating type heat conducting member 30 in the gap 31, with the simple configuration. Accordingly, the warpage of the circuit board or the heat dissipating member occurring when a pre-molded heat conducting sheet is used may be suppressed, and it may be avoided that the light emitting elements are deviated from the positions of the focal points of the reflecting surfaces of the reflectors thereby deteriorating the light distribution characteristic.

Fourth Exemplary Embodiment

Figure 7:
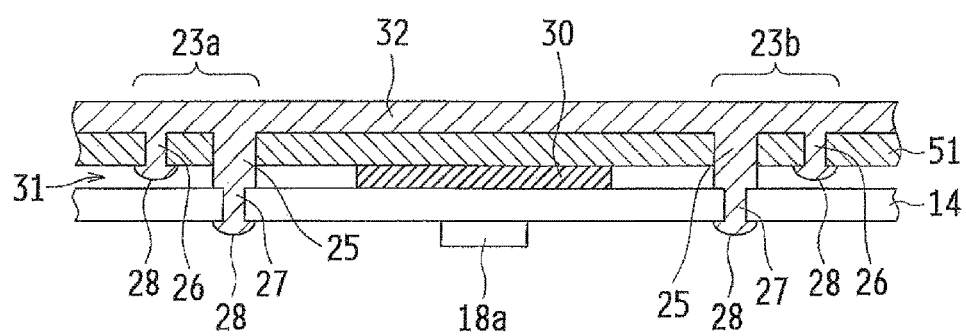
FIG. 7 is a schematic view illustrating the holding of a high beam substrate and a high beam heat dissipating plate by heat dissipating holding bosses in a fourth exemplary embodiment.

Next, a fourth exemplary embodiment of the present exemplary embodiment will be described with reference to FIG. 7. Descriptions of overlapping portions with those of the first exemplary embodiment will be omitted. FIG. 7 is a schematic view illustrating the holding of the high beam substrate 14 and the high beam heat dissipating plate 51 by the heat dissipating plate holding bosses 23a and 23b in the fourth exemplary embodiment, and a partial sectional view schematically illustrating the area B surrounded by the circle in FIG. 1 in an enlarged scale.

As illustrated in FIG. 7, in the present exemplary embodiment, a heat dissipating member holder 32 which is separate from the high beam reflector unit 16 is provided. The heat dissipating member holder 32 is a member formed with the heat dissipating plate holding bosses 23a to 23c to hold the high beam substrate 14 and the high beam heat dissipating plate 51 from the top portion of the high beam heat dissipating plate 51. FIG. 7 illustrates the heat dissipating member holding member 32 covering the entire surface of the high beam heat dissipating plate 51. However, in order to ensure the efficiency of the heat dissipation from the high beam heat dissipating plate 51, some portions of the top surface of the high beam heat dissipating plate 51 may be exposed by providing openings in the other areas (not illustrated) of the heat dissipating member holding member 32.

The heat dissipating plate holding bosses 23a to 23c have a shape in which a plurality of bosses are formed to project downward from the heat dissipating member holder 32 with different heights, and include the heat dissipating plate contact stages 26, the circuit board contact stages 25, and the heat caulking stages 27 from the side having the low projection height. The circuit board contact stages 25 and the heat caulking stages 27 have a multistage shape in which stages have different diameters. Accordingly, the heat dissipating plate holding bosses 23a to 23c function as a spacer to hold a predetermined interval between the high beam substrate 14 and the high beam heat dissipating plate 51 so as to form the gap 31.

Holes having substantially the same diameters as those of the heat dissipating plate contact stages 26 and the circuit board contact stages 25, respectively, are formed at the positions on the high beam heat dissipating plate 51 which correspond to the heat dissipating plate holding bosses 23a and 23b, respectively. The heat dissipating plate contact stages 26 and the circuit board contact stages 25 are aligned with and inserted into the holes, respectively. Further, holes having substantially the same diameter as that of the heat caulking stages 27 are formed at the positions on the high beam substrate 14 which correspond to the heat dissipating plate holding bosses 23a and 23b, respectively. The heat caulking stages 27 are aligned with and inserted into the holes, respectively. Accordingly, the bottom surfaces of the circuit board contact stages 25 are in contact with the top (rear) surface of the high beam substrate 14, and the high beam substrate 14 is held by the circuit board contact stages 25.

The tip ends of the heat caulking stages 27 partially project from the holes of the high beam substrate 14, and the projecting tip ends are heated and pressed to be plastically deformed so as to form deformed tip end portions 28 for covering the holes. The distance of the high beam substrate 14 from the heat dissipating member holder 32 is fixed by the bottom surfaces of the heat dissipating plate contact stages 26 and the deformed tip end portions 28. The tip ends of the heat dissipating plate contact stages 26 also partially project from the holes of the high beam heat dissipating plate 51, and the projecting tip ends are heated and pressed to be plastically deformed so as to form deformed tip end portions 28 for covering the holes such that the heat dissipating member holder 32 is fixed to be in contact with the high beam heat dissipating plate 51. In addition, the high beam substrate 14 is heat-caulked in holes (not illustrated) of the high beam substrate 14 by the heat caulking bosses 24a to 24d provided to project from the top plate 21 as described above such that the height direction of the high beam substrate 14 is fixed.

Here, the horizontal position of the high beam substrate 14 is determined by the holes of the high beam substrate 14 and the heat caulking stages 27. The horizontal position of the high beam heat dissipating plate 51 is determined by the holes of the high beam heat dissipating plate 51, the circuit board contact stages 25, and the heat dissipating plate contact stages 26.

As described above, in the present exemplary embodiment, the circuit board contact stages 25 and the heat caulking stages 27 have a multistage shape in which stages have different diameters, and the height of each circuit board contact stage 25 corresponds to the sum of the thickness of the high beam heat dissipating plate 51 and the distance of the gap 31. Accordingly, the circuit board contact stages 25 function as a spacer disposed between the high beam substrate 14 and the high beam heat dissipating plate 51 to hold the gap 31. In the gap 31, the heat conducting member 30 is coated on the rear surface side of the area on which the first LED 18a is mounted, and sandwiched between the high beam substrate 14 and the high beam heat dissipating plate 51 to be in contact with and rolled between the high beam substrate 14 and the high beam heat dissipating plate 51.

In the present exemplary embodiment as well, since the heat dissipating plate holding bosses 23a to 23c are molded of a resin to be integral with the heat dissipating member holder 32, the processing of a very precise shape in the unit of several microns may be performed, and the manufacturing process and structure may also be simplified, the cost reduction may be achieved. Further, since the shape of the high beam substrate 14 or the high beam heat dissipating plate 51 may be simplified, and the heat dissipating plate may be shaped by the press working, the manufacturing process and structure may be simplified so that the cost reduction may be achieved. Further, since the tip ends of the heat dissipating plate holding bosses 23a to 23c serve as the heat caulking stages 27, the heat caulking may be used as a means for fastening the high beam substrate 14, and a reduction of the number of components or a miniaturization of components and the simplification of the manufacturing process may be achieved.

Accordingly, in the vehicle lamp 10 of the present exemplary embodiment, the insulation and the heat conductivity may be ensured by securing the gap 31 between the rear surface of the high beam substrate 14 and the high beam heat dissipating plate 51 and disposing the coating type heat conducting member 30 in the gap 31, with the simple configuration. Accordingly, the warpage of the circuit board or the heat dissipating member occurring when a pre-molded heat conducting sheet is used may be suppressed, and it may be avoided that the light emitting elements are deviated from the positions of the focal points of the reflecting surfaces of the reflectors thereby deteriorating the light distribution characteristic.

Fifth Exemplary Embodiment

Figure 8:
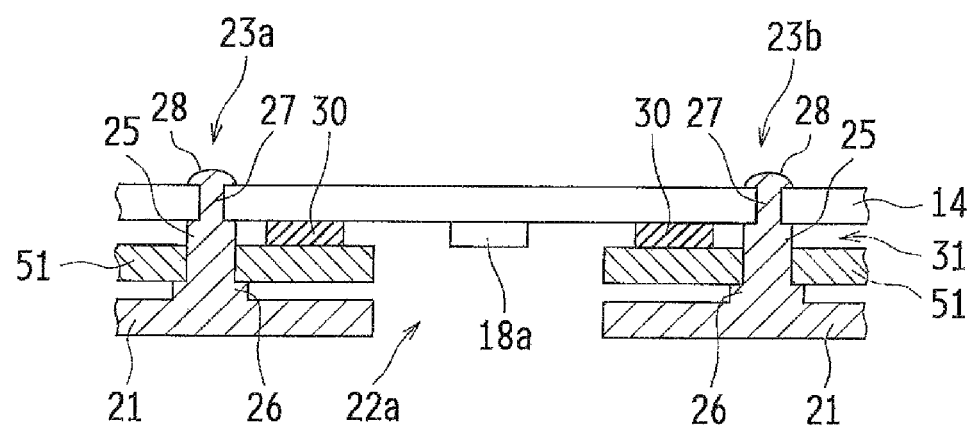
FIG. 8 is a schematic view illustrating the holding of a high beam substrate and a high beam heat dissipating plate by heat dissipating holding bosses in a fifth exemplary embodiment.

Next, a fifth exemplary embodiment of the present disclosure will be described with reference to FIG. 8. Descriptions of overlapping portions with those of the first exemplary embodiment will be omitted. FIG. 8 is a schematic view illustrating the holding of the high beam substrate 14 and the high beam heat dissipating plate 51 by the heat dissipating plate holding bosses 23a and 23b, and a partial sectional view schematically illustrating the area B surrounded by the circle in FIG. 1 in an enlarged scale. The present exemplary embodiment is different from the first exemplary embodiment in that, in the present exemplary embodiment, the high beam heat dissipating plate 51 is disposed between the high beam substrate 14 and the top plate 21.

The heat dissipating plate holding bosses 23a and 23b have a multistage shape formed with a plurality of stages having different diameters and include the heat dissipating plate contact stages 26, the circuit board contact stages 25, and the heat caulking stages 27 from the lower portions thereof.

Holes having substantially the same diameter as that of the circuit board contact stages 25 are formed at the positions on the high beam heat dissipating plate 51 which correspond to the heat dissipating plate holding bosses 23a and 23b, and the circuit board contact stages are aligned with and inserted into the holes, respectively. Accordingly, the top surfaces of the heat dissipating contact stages 26 are in contact with the bottom surface of the high beam heat dissipating plate 51, and the high beam heat dissipating plate 51 is held by the heat dissipating plate contact stages 26. In addition, an opening is provided in an area of the high beam heat dissipating plate 51 which corresponds to the opening 22a of the top plate 21, and the first LED 18a is mounted on the high beam substrate 14 above the area of the opening 22a to face downward and be opposite to the reflecting surface 19a (not illustrated).

The rear end side (the right direction in FIG. 2) of the high beam heat dissipating plate 51 may extend reward from the high beam substrate 14 and have a structure for improving the heat dissipation efficiency (not illustrated). In this case, the extension a of the high-beam radiator plate 51 may be vertically bent by a press working to be used as a heat dissipation film.

Holes having substantially the same diameter as that of the heat caulking stages 27 are also provided at the positions on the high beam substrate 14 which correspond to the heat dissipating plate holding bosses 23a and 23b, and the heat caulking stages 27 are aligned with and inserted into the holes, respectively. Accordingly, the top surfaces of the circuit board contact stages 25 are in contact with the bottom surface of the high beam substrate 14, and the high beam substrate 14 is held by the circuit substrate contact stages 25.

Here, the horizontal position of the high beam substrate 14 is determined by the holes of the high beam substrate 14 and the heat caulking stages 27, and the horizontal position of the high beam heat dissipating plate 51 is determined by the holes of the high beam heat dissipating plate 51 and the heat dissipating plate contact stages 26. Descriptions are made on the example where the holes formed on the high beam substrate 14 and the heat caulking stages 27 have substantially the same diameter, and the holes formed on the high beam heat dissipating plate 51 and the heat dissipating plate contact stages 26 have substantially the same diameter. However, the holes and the stages may have a diameter forming a certain gap as long as each stage of the multistage shape may be inserted.

The tip ends of the heat caulking stages 27 partially project from the holes of the high beam substrate 14, and the projecting tip ends are heated and pressed to be plastically deformed so as to form deformed tip end portions 28 for covering the holes. The height direction of the high beam substrate 14 is fixed by the top surfaces of the circuit board contact stages 25 and the deformed tip end portions 28. The high beam heat dissipating plate 51 is heat-caulked by the above-described heat caulking bosses 24a to 24d, and the height direction of the high beam heat dissipating plate 51 is fixed by the top surfaces of the heat dissipating plate contact stages 26 and the heat caulking bosses 24a to 24d.

As illustrated in FIG. 8, the heat dissipating plate holding bosses 23a and 23b are formed to project from the top plate 21, and the high beam substrate 14 and the high beam heat dissipating plate 51 are held by the heat dissipating plate holding bosses 23a and 23b such that the gap 31 between the high beam substrate 14 and the high beam heat dissipating plate 51 is secured. In the gap 31, the heat conducting member 30 is coated on the rear surface side of the area on which the first LED 18a is mounted, and sandwiched between the high beam substrate 14 and the high beam heat dissipating plate 51 to be in contact with and rolled between the high beam substrate 14 and the high beam heat dissipating plate 51.

As described above, in the present exemplary embodiment, the heat dissipating plate holding bosses 23a and 23b have a multistage shape, and a difference of height between each heat dissipating plate contact stage 26 and each circuit hoard contact stage 25 corresponds to a sum of the thickness of the high beam heat dissipating plate 51 and the distance of the gap 31. Thus, the circuit board contact stages 25 function as a spacer disposed between the high beam substrate 14 and the high beam heat dissipating plate 51 to hold the gap 31.

In the present exemplary embodiment as well, since the heat dissipating plate holding bosses 23a to 23c are molded of a resin to be integral with the top plate 21 of the high beam reflector unit 16, the processing of a very precise shape in the unit of several microns may be performed, and the manufacturing process and structure may also be simplified, the cost reduction may be achieved. Further, since the shape of the high beam substrate 14 or the high beam heat dissipating plate 51 may be simplified, and the heat dissipating plate may be shaped by the press working, the manufacturing process and structure may be simplified so that the cost reduction may be achieved. Further, since the tip ends of the heat dissipating plate holding bosses 23a to 23c serve as the heat caulking stages 27, the heat caulking may be used as a means for fastening the high beam heat dissipating plate 51, and a reduction of the number of components or a miniaturization of components and the simplification of the manufacturing process may be achieved.

Accordingly, in the vehicle lamp 10 of the present exemplary embodiment, the insulation and the heat conductivity may be ensured by securing the gap 31 between the rear surface of the high beam substrate 14 and the high beam heat dissipating plate 51 and disposing the coating type heat conducting member 30 in the gap 31, with the simple configuration. Accordingly, the warpage of the circuit board or the heat dissipating member occurring when a pre-molded heat conducting sheet is used may be suppressed, and it may be avoided that the light emitting elements are deviated from the positions of the focal points of the reflecting surfaces of the reflectors thereby deteriorating the light distribution characteristic.

Sixth Exemplary Embodiment

In the first to fifth exemplary embodiments, descriptions have been made on the example where the vehicle lamp 10 is in a multi-lamp form. However, even when other optical system configurations such as, for example, a projector type, a PES type, or a parabola type are adopted, a gap between the front surface of the circuit board and the heat dissipating member may be secured with the simple configuration, and the insulation and the heat conductivity may be ensured by disposing the coating type heat conducting member in the gap. Further, the warpage of the circuit board or the heat dissipating member occurring when a pre-molded heat conducting sheet is used may be suppressed, and it may be avoided that the light emitting elements are deviated from the positions of the focal points of the reflecting surfaces of the reflectors thereby deteriorating the light distribution characteristic.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A vehicle lamp comprising:
    a circuit board having a front surface and a rear surface and including a light emitting element mounted on the front surface;
    a heat dissipating member disposed to be opposite to the circuit board;
    a spacer made of a resin and configured to support the circuit board and the heat dissipating member to form a gap between the circuit board and the heat dissipating member; and
    a coating type insulative heat conducting member filled into the gap formed between the circuit board and the heat dissipating member.

2. The vehicle lamp of claim 1, wherein the coating type heat conducting member is a heat conductive grease or a heat conductive adhesive.

3. The vehicle lamp of claim 2, further comprising:
    a circuit board holding member configured to hold the circuit board,
    wherein the spacer is formed integrally with the circuit board bolding member.

4. The vehicle lamp of claim 2, wherein the coating type heat conducting member contains a filler, and the interval between the circuit board and the heat dissipating member is larger than a maximum grain size of the filler.

5. The vehicle lamp of claim 2, further comprising:
    a heat dissipating member holder configured to hold the heat dissipating member, wherein the spacer is a boss formed to project from the heat dissipating member holder to be in contact with the rear surface.

6. The vehicle lamp of claim 4, further comprising:
a circuit board holding member configured to hold the circuit board,
wherein the spacer is formed integrally with the circuit board bolding member.

7. The vehicle lamp of claim 4, further comprising:
a heat dissipating member holder configured to hold the heat dissipating member,
wherein the spacer is a boss formed to project from the heat dissipating member holder to be in contact with the rear surface.

8. The vehicle lamp of claim 1, further comprising:
a circuit board holding member configured to hold the circuit board,
wherein the spacer is formed integrally with the circuit board bolding member.

9. The vehicle lamp of claim 8, wherein the spacer is a boss formed to project from the circuit board holding member.

10. The vehicle lamp of claim 9, wherein the boss has a multistage shape provided with a first holder that is in contact with the circuit board and a second holder that is in contact with the heat dissipating member.

11. The vehicle lamp of claim 8, wherein the circuit board holding member is a reflector having a reflecting surface to reflect light from the light emitting element.

12. The vehicle lamp of claim 9, wherein the circuit board holding member is a reflector having a reflecting surface to reflect light from the light emitting element.

13. The vehicle lamp of claim 10, wherein the circuit board holding member is a reflector having a reflecting surface to reflect light from the light emitting element.

14. The vehicle lamp of claim 10, wherein a hole having the same diameter as that of the second holder is formed at a position on the circuit board which corresponds to the boss, and
the second holder is aligned with and inserted into the hole.

15. The vehicle lamp of claim 10, wherein a difference in a height between the first holder and the second holder is equal to a sum of a thickness of the circuit board and a distance of the gap.

16. The vehicle lamp of claim 1, wherein the coating type heat conducting member contains a filler, and the gap between the circuit board and the heat dissipating member is larger than a maximum grain size of the filler.

17. The vehicle lamp of claim 16, further comprising:
a circuit board holding member configured to hold the circuit board,
wherein the spacer is formed integrally with the circuit board bolding member.

18. The vehicle lamp of claim 16, further comprising:
a heat dissipating member holder configured to hold the heat dissipating member,
wherein the spacer is a boss formed to project from the heat dissipating member holder to be in contact with the rear surface.

19. The vehicle lamp of claim 1, further comprising:
a heat dissipating member holder configured to hold the heat dissipating member,
wherein the spacer is a boss formed to project from the heat dissipating member holder to be in contact with the rear surface.

20. The vehicle lamp of claim 1, wherein the gap is in a range of about 0.05 to about 1.5 mm.

* * * * *